(No Model.) 7 Sheets—Sheet 1.
W. W. DOOLITTLE.
APPARATUS FOR MAKING CASTINGS.
No. 501,331. Patented July 11, 1893.
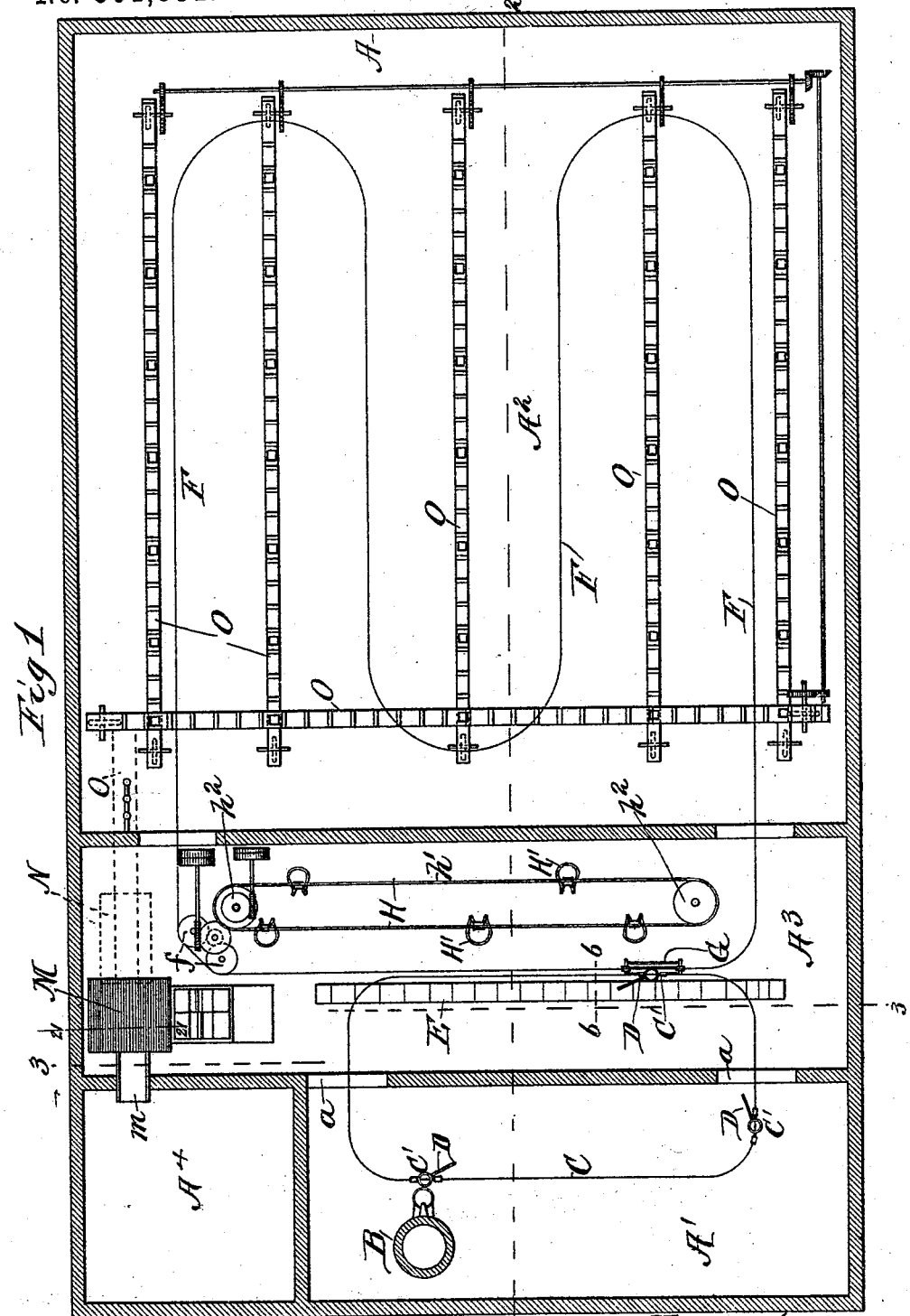
Witnesses
W. C. Coolies
J. W. Adams
Inventor
William W. Doolittle
By Coburn & Thacher
Attys (No Model.) 7 Sheets—Sheet 2.
W. W. DOOLITTLE.
APPARATUS FOR MAKING CASTINGS.
No. 501,331. Patented July 11, 1893.
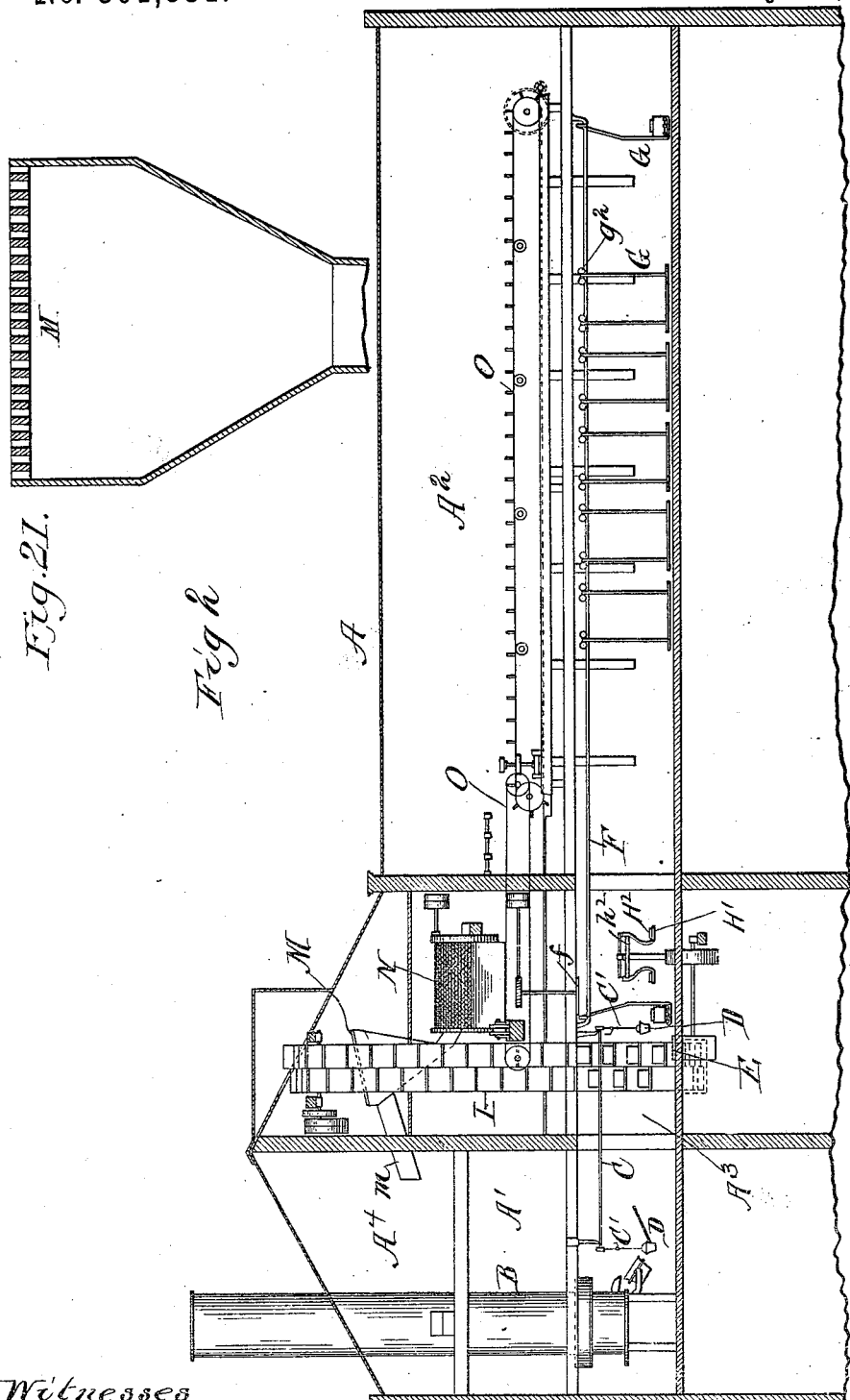
Witnesses
W. C. Coolies
J. W. Adams
Inventor
William W. Doolittle
By Coburn & Thacher
Attys

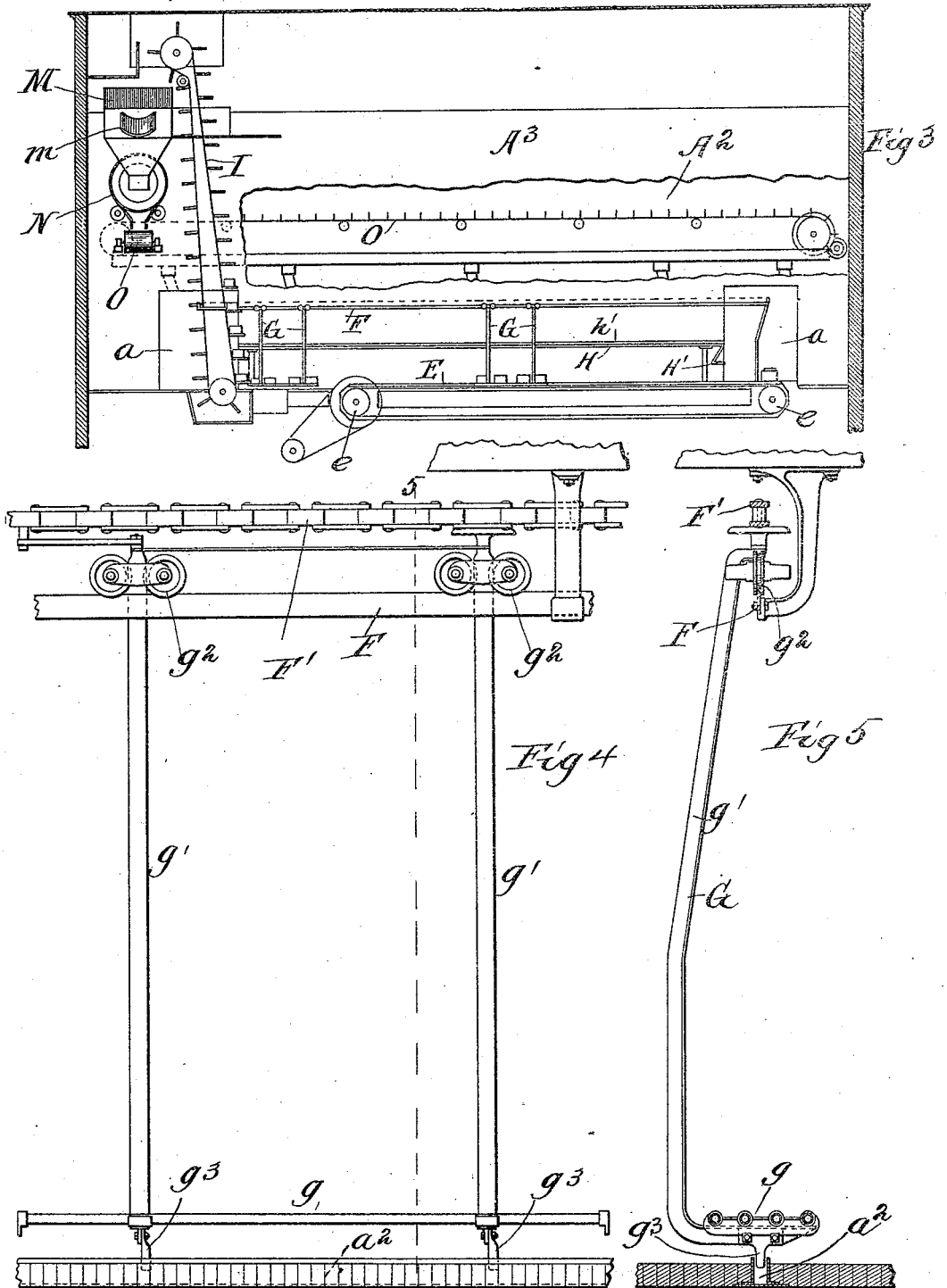

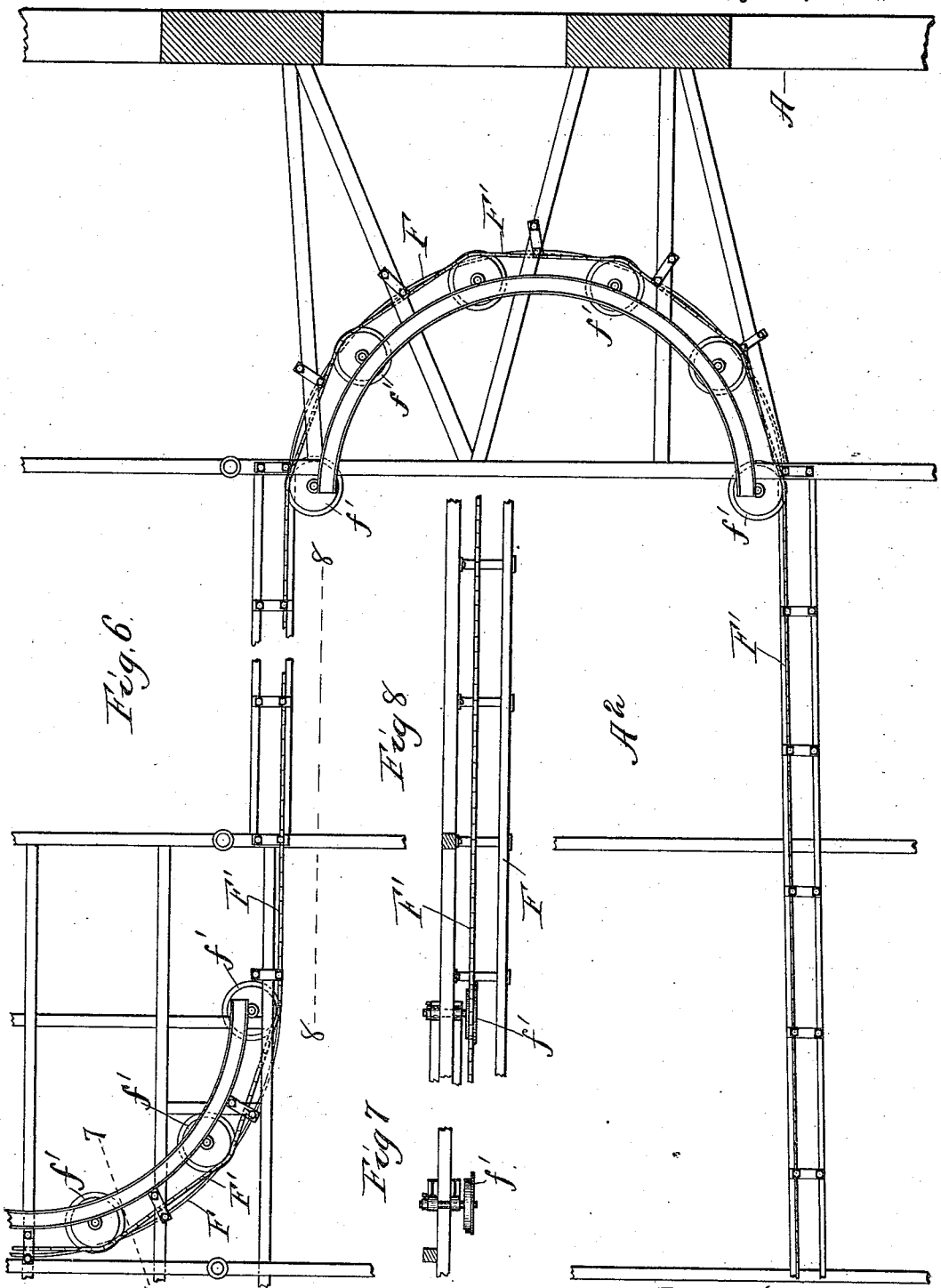

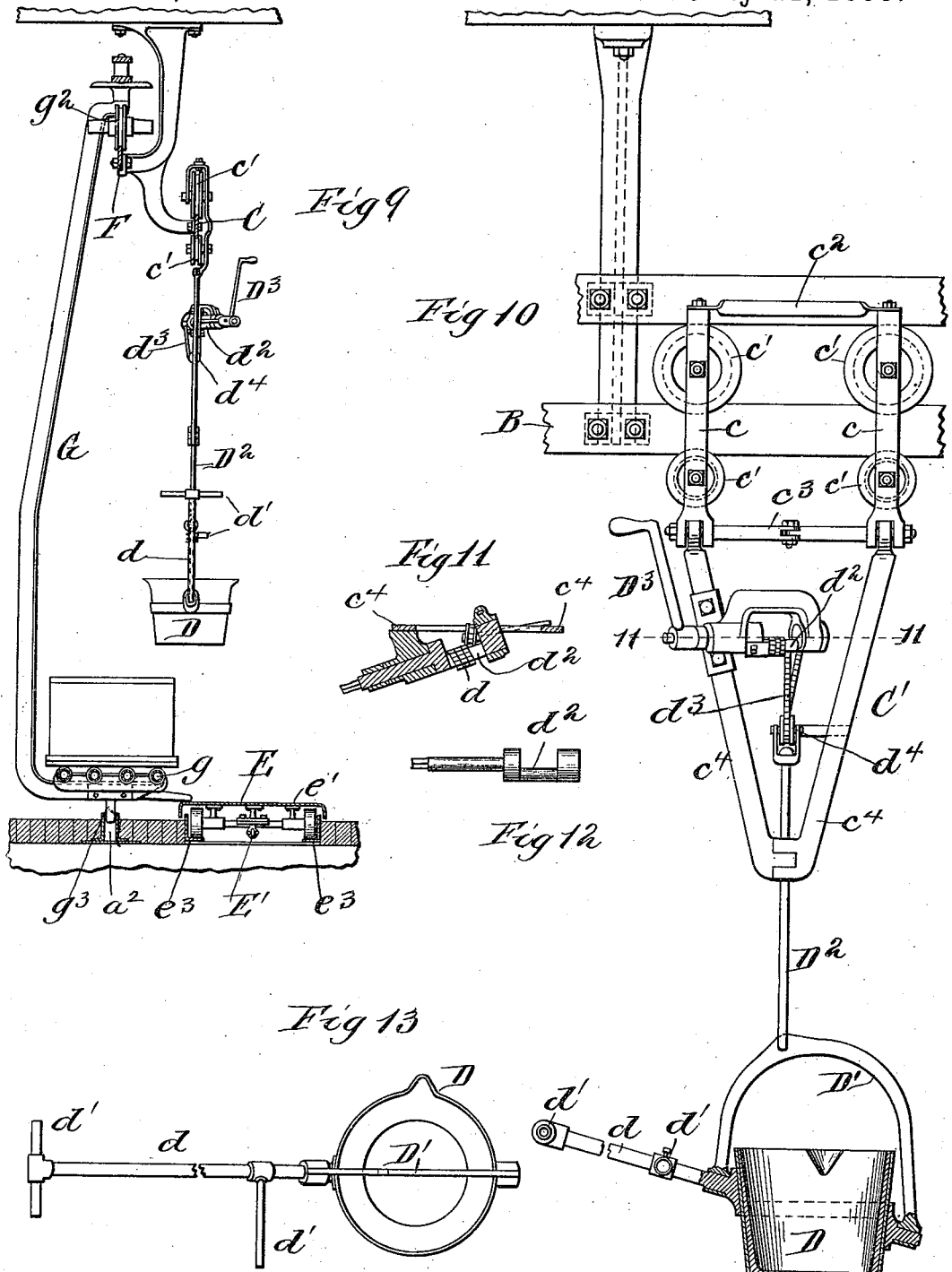

(No Model.) 7 Sheets—Sheet 6.

W. W. DOOLITTLE.
APPARATUS FOR MAKING CASTINGS.

No. 501,331. Patented July 11, 1893.

Witnesses
W. C. Coiles
J. W. Adams

Inventor
William W. Doolittle
By Coburn & Thacher
Attys

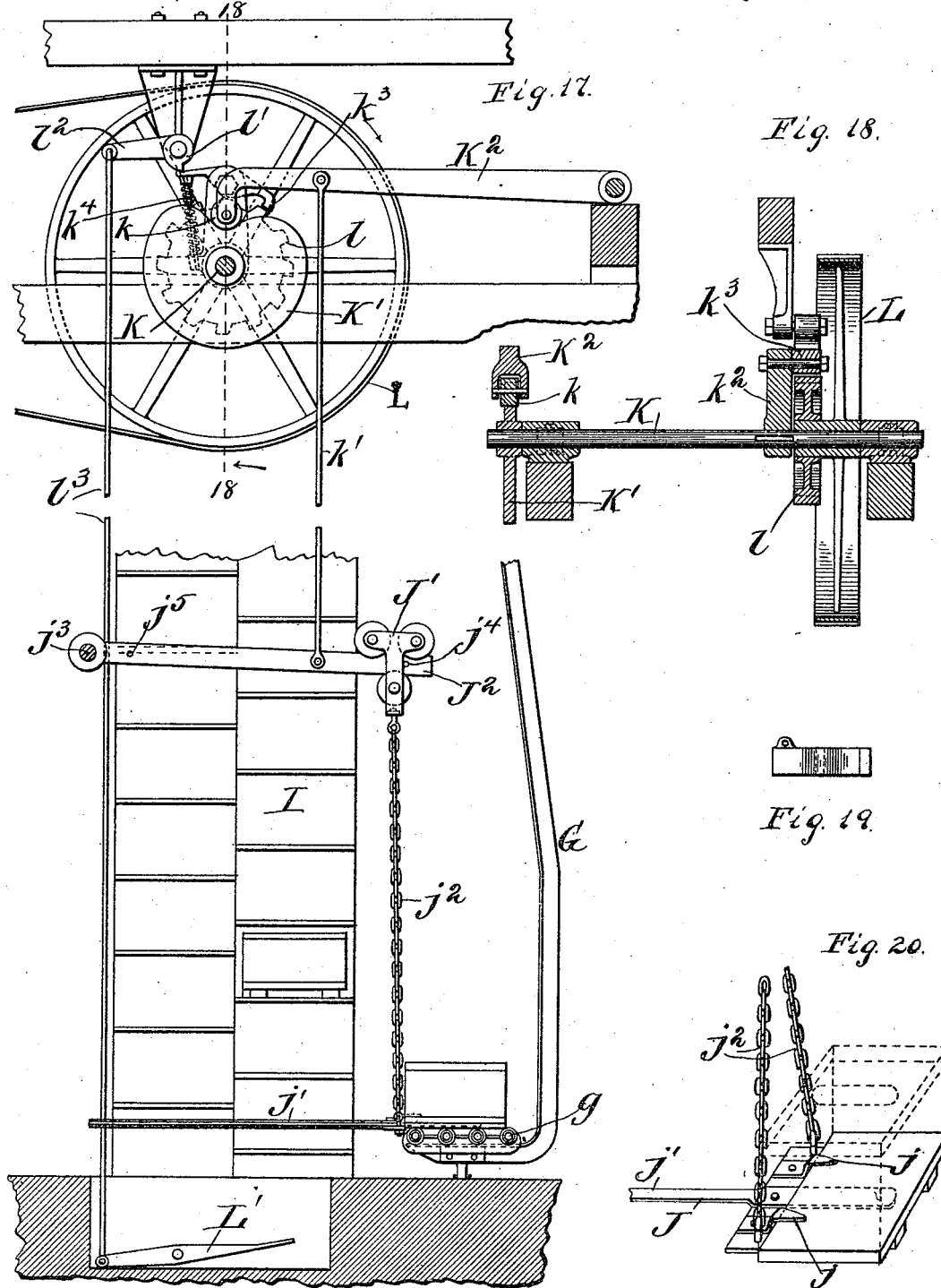

UNITED STATES PATENT OFFICE.

WILLIAM W. DOOLITTLE, OF CHICAGO, ILLINOIS, ASSIGNOR TO THE CRANE COMPANY, OF SAME PLACE.

APPARATUS FOR MAKING CASTINGS.

SPECIFICATION forming part of Letters Patent No. 501,331, dated July 11, 1893.

Application filed July 5, 1892. Serial No. 438,961. (No model.)

*To all whom it may concern:*

Be it known that I, WILLIAM W. DOOLITTLE, a citizen of the United States, residing at Chicago, in the county of Cook and State of Illinois, have invented certain new and useful Improvements in Apparatus for Making Castings, which are fully set forth in the following specification, reference being had to the accompanying drawings, in which—

Figure 14:
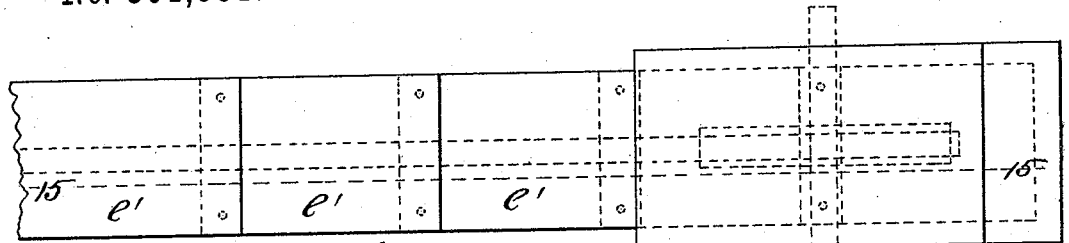
Figure 15:
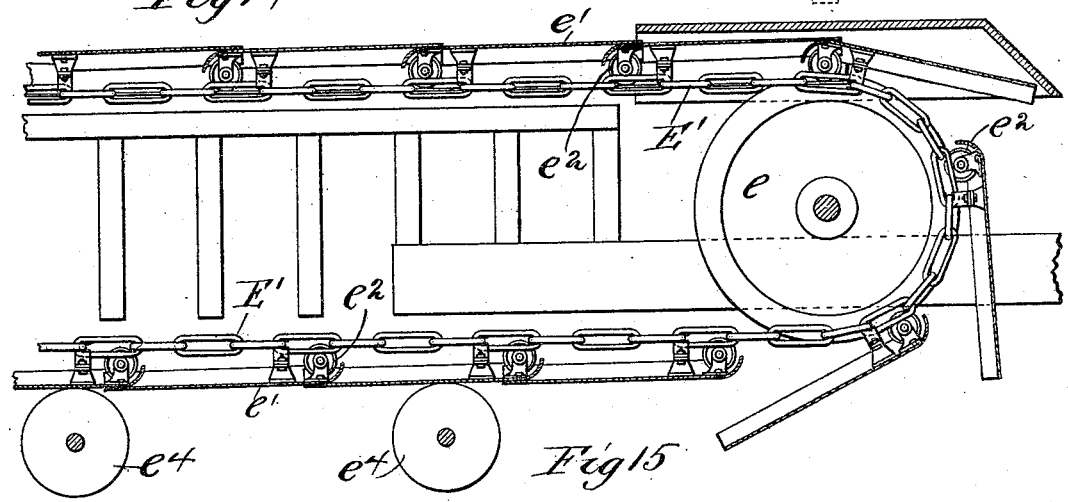
Figure 16:
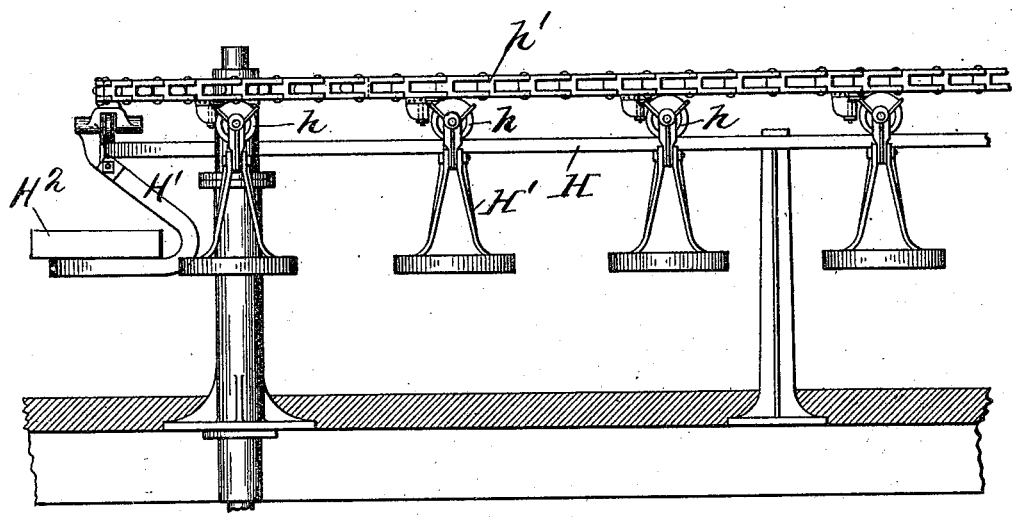

Figure 1 represents a horizontal plan section of an apparatus for making castings. Fig. 2, is a vertical longitudinal section, taken on the line 2—2, of Fig. 1. Fig. 3, is a detail cross-section, taken on the line 3—3, of Fig. 1. Fig. 4, is an elevation of one of the mold carriers, detached. Fig. 5, is a cross-section of the same, taken on the line 5—5, of Fig. 4. Fig. 6, is a detail plan view of a portion of the track on which the carriers are mounted. Fig. 7, is a detail cross-section of the track showing one of the sheave-wheels, taken on the line 7—7, of Fig. 6. Fig. 8, is a detail sectional view of the track and chain, taken on the line 8—8, of Fig. 6. Fig. 9, is a detail side elevation of one of the conveyers with the pouring ladle and with a portion of the movable platform shown in section. Fig. 10, is a side elevation of the trolley which supports the ladle and the same is shown mounted on the track. Fig. 11, is a detail plan section of the windlass portion of the trolley, taken on the line 11—11, of Fig. 10. Fig. 12, is a side elevation of the windlass or drum, detached. Fig. 13, is a plan view of the pouring ladle. Fig. 14, is a plan view of the movable platform. Fig. 15, is a detail section of the same, taken on the line 15—15, of Fig. 14. Fig. 16, is a side elevation of the weight-conveying apparatus. Fig. 17, is a front elevation of the hoisting apparatus for removing the molding-boxes or flasks from the conveyers to the elevator, the lower portion of one of the conveyers being shown in the same figure. Fig. 18, is a detail section of the hoisting mechanism, taken on the line 18—18, of Fig. 17. Fig. 19, is a bottom plan view of the spring-pawl shown in Fig. 17. Fig. 20, is a perspective view of the tongue or fork-piece for removing the flasks from the conveyers, as shown in Fig. 17, and Fig. 21 a detail vertical section of the screen, taken on the line 21. 21 of Fig. 1.

Figs. 1 to 3, inclusive, are on the same scale. Figs. 4 to 20, inclusive, are on an enlarged scale from Figs. 1 to 3.

This invention relates to apparatus for manufacturing castings and has for its object to provide a plant or apparatus wherein the amount of manual labor employed is reduced to a minimum, more particularly in the transportation of the molds, molten metal, castings and sand from place to place as they may be required, so that a great saving in time and labor is effected, resulting in a material reduction in the cost of production of the casting.

To this end the invention consists in certain novel features which I will now proceed to describe and will then point out in the appended claims.

In the accompanying drawings I have shown an apparatus or plant which embodies my invention in one form. In the said drawings, A represents a building or structure adapted to house and protect the plant and provided at one end with a room or space, A', which I term the cupola-room, a second room or space, A², at the other end which is the molding room, and an intermediate room or space, A³, which is the pouring room. In the construction shown these rooms are separated by intermediate partition walls, but these latter may, of course, be dispensed with. In the cupola room A' is located a cupola, B, of any approved construction. An endless track, C, extends from a point near the cupola B into and through the pouring room A³, returning thence to the cupola room, as clearly shown in Fig. 1. In case partition walls are employed suitable openings or doorways, *a*, will be provided through which the track C may pass.

Upon the track C is mounted a plurality of carriers, C', by means of which the pouring ladles, D, are supported and transported. These carriers may, for the general purposes of my invention, be of any suitable construction, but in practice I prefer to use a form of carrier which is of my invention and which is shown in the accompanying drawings and more particularly in Figs. 9 to 13 thereof, inclusive.

In this construction the carrier, which is indicated as a whole by the reference letter C', is flexible both vertically and horizontally. The upper portion of the carrier C' is a truck composed of two uprights, c, each provided with trolley-wheels, c', said trolley wheels being grooved and located respectively above and below the track B. The uprights c are connected at the top by a flexible and elastic member, $c^2$, and at their lower ends by a member, $c^3$, composed of two parts hinged at their center upon a vertical pivot. To the ends of the uprights c there are hinged upon a horizontal axis, formed in this instance by the member $c^3$, two arms, $c^4$, which extend downward toward each other and are united at their lower ends in a hinged joint, having a vertical axis or pivot in line with the pivot connecting the two parts of the member $c^3$. It will thus be seen that the frame of the carrier C' is flexible around a vertical axis, which flexibility permits it to pass around the curves of the track B without any undue friction and without causing the trolley-wheels to bind against the track, or to leave the same. The elastic member $c^2$ connecting the upper ends of the uprights c always tends to return the two halves of the carrier frame into a position in line with each other when they have been deflected and to retain them in that, their normal position at all other times. The flexibility of the carrier frame upon the horizontal axis permits the lower portion thereof to be swung laterally in either direction from the track to bring the pouring ladle into the proper position for pouring.

The pouring ladle, D, is mounted in a yoke, D', the axis, d, which forms the connection between the two, being arranged at an inclination, as shown, in order to bring the handles, d', with which said axis is provided, into a convenient position to be grasped by the operator. The yoke D' is supported by a rod, $D^2$, which is connected to said yoke at a little one side of the center thereof in order to cause the ladle and its handled axis to balance properly. The rod $D^2$ is connected with the carrier C' by means of a winch, $D^3$, whereby the said rod and the ladle supported thereby may be raised and lowered, as desired. The winch $D^3$ is provided with an eccentric drum, $d^2$, and a chain or other suitable flexible connecting device, $d^3$, attached to and passing around the said drum, passes under a pulley, $d^4$, on the upper end of the supporting rod $D^2$, and has its other end attached to the winch frame. The eccentricity of the drum is sufficient to cause the weight of the ladle to lock the winch in the position shown in Fig. 10, whenever the winch handle is released; of course any other suitable winch, either automatically-locking or not, may be employed, instead of that shown.

The main portion of the track C, within the pouring room $A^3$, is desirably straight, and underneath and parallel with this straight portion of the track C, is located an endless moving platform, E. This may be of any suitable construction for the purpose, that which I prefer being of my invention and being shown in detail in Figs. 9, 14 and 15 of the drawings. In this construction an endless chain E', passes around two wheels or pulleys, e, one of which is driven from any suitable source to impart motion to the chain. To the chain E' is connected, at suitable intervals, a series of plates, e', so arranged as to overlap each other when in their normal or horizontal position. These plates are provided with rollers, $e^2$, which travel upon tracks, $e^3$, along the upper portion of the space between the wheels or pulleys e, thus serving to support the said plates during this portion of their travel, during which they have to carry the weight of the attendant or attendants. Supporting rollers, $e^4$, serve to carry the return or undermost portion of the chain and prevent its sagging.

F represents a track which is endless and extends through the pouring and molding rooms in the manner shown more particularly in Fig. 1. The main portion of the track, within the pouring room, is straight and parallel with the straight portion of the track C and moving platform E, immediately adjacent to which it is arranged and beyond which it extends some little distance, as shown in said figure. That portion of the track F which is within the molding room, is preferably made sinuous or winding, in order to increase its length and bring it into the desired proximity with as much of the molding space within said room as possible. Upon the track F there is mounted to travel a plurality of carriers, G, which are adapted to receive, support and transport the molds. These carriers may be of any approved construction and in the drawings I have shown a preferred form, of my invention, comprising a base or platform, g, hangers, g', and trolley-wheels, $g^2$, adapted to travel upon the track F. The track F supports and guides the carriers G throughout their course, but along the straight portion of their course, within the pouring room $A^3$, I provide an additional means for guiding the carrier, consisting of a grooved way, $a^2$, underneath the bottom of the carrier which receives downward projections, $g^3$, from the carrier. These projections, engaging with the grooved way, prevent any lateral displacement of the lower portion of the carrier during the operation of pouring. The carriers G are moved continuously along the track F by suitable actuating means, such, for instance, as a sprocket chain, F', to which the carriers are suitably connected and along which they move. The sprocket-chain is actuated by any suitable mechanism, such, for instance, as that shown in Figs. 1 and 2, where one or more of the sprocket wheels, f, around which it passes, is driven by power from any suitable source. The remaining sprocket-wheels, $f'$, are idlers which serve to guide the chain around the curves of the track, as shown in Fig. 6 of the drawings.

Within the pouring room $A^3$ there is located an endless track, H, arranged parallel with the tracks C and F and provided with a plurality of carriers, H', supported on said track by trolley-wheels, $h$, and actuated by a sprocket chain, $h'$, passing around two sprocket wheels, $h^2$, one of which is driven from any suitable source to move the chain. These carriers are adapted to receive and support weights, $H^2$, for the purpose hereinafter set forth.

At that end of the pouring room $A^3$ toward which the carriers move is located an elevator, I, of any suitable construction and between the path of the carriers and the said elevator is arranged a hoisting and transferring device by means of which the molds may be lifted from the carrier and placed upon the elevator. This device is shown in detail in Figs. 17 to 20, inclusive, of the drawings and comprises a fork, J, having arms, $j$, adapted to receive and grasp between them the board on which the mold rests, as shown in Fig. 20, and a handle, $j'$, by means of which it may be guided and manipulated. This fork is suspended by means of chains, $j^2$, from a truck, J', mounted on a tilting-track, $J^2$, pivoted at its farther end on a suitable shaft or support, $j^3$, and extending across the elevator I to the path of the carriers G. Stops, $j^4$, $j^5$, limit the travel of the truck J' upon the tilting track $J^2$ in each direction. In the position of the tilting track $J^2$ shown in Fig. 17, in which its free end is below its pivotal connection, the truck J' is at the outer end of said track, bearing against the stop $j^4$ and in position to bring the fork J in convenient proximity to the carriers G. When, however, the end of the tilting track $J^2$ is raised, by means of the mechanism hereinafter described, or other suitable mechanism, so that its free outer end is above the pivotal point at its other end, it is obvious that the truck J' will, by gravity, travel along the said tilting track across the elevator and will carry the fork along with it, this latter being guided and the truck controlled by means of the attendant who grasps the handle $j'$. By this means the molds may be lifted from the carriers and deposited upon the elevator at any desired point.

The following is the mechanism which I prefer for operating the tilting track $J^2$.

K indicates an overhead shaft on which is secured a cam, K', on the periphery of which bears a lever, $K^2$, provided with an anti-friction roller, $k$. A connecting-rod, $k'$, extends from the lever $K^2$ to the tilting track $J^2$ and serves, when the cam K' is rotated, to raise the track $J^2$ and hold it in a raised position during the greater part of the revolution of the said cam, restoring it to its lower position at the end of each revolution.

L is a continuously-rotating pulley driven from any suitable source, mounted loosely on the shaft K and carrying with it a ratchet-wheel, $l$. An arm, $k^2$, is secured to the shaft K immediately adjacent to the ratchet-wheel $l$ and has pivoted to it a pawl, $k^3$, provided with a spring, $k^4$, or other suitable means for forcing it into engagement with the ratchet-wheel $l$ when free to move in that direction. A cam, $l'$, bears upon the spring-pawl, $k^3$ and holds it normally out of engagement with the ratchet-wheel $l$. To this cam is connected an arm $l^2$, from which a rod, $l^3$, extends downward to a foot-lever, L', by means of which the cam $l'$ may be rotated sufficiently to free the pawl $k^3$ and cause it to engage with the ratchet-wheel $l$. It will be seen that upon depressing the foot-lever L', the cam $l'$ is so rotated as to free the pawl $k^3$ and to cause it to engage with the ratchet-wheel $l$. The rotary movement of the ratchet-wheel is thus imparted to the shaft K and to the cam K', these parts making one revolution and lifting the tilting track $J^2$ through the medium of the lever $K^2$ and connecting rod $k'$ in the manner already described. In the meantime, however, the lever L' is released and the cam $l'$ returns to the position shown in Fig. 17 of the drawings, so that when the pawl $k^3$ completes its revolution it comes again into contact with the cam $l'$ and is disengaged from the ratchet-wheel $l$, thus arresting the movement of the shaft K and cam K' and leaving the tilting track $J^2$ stationary in its original position with its free end lowered. The cam $l'$ is returned, as mentioned above, by the force of gravity, the weight of the rod $l^3$ and the arm $l^2$, to which it is connected, being sufficient for this purpose. It will thus be seen that by depressing the foot-lever L' the attendant can cause the truck J' to lift the fork J, carry the same across the elevator and back to its original position and then leave it stationary there until its services are again required.

At the upper or discharge end of the elevator I is arranged a screen, M; in the drawings this screen is shown inclined. This screen is of such a mesh as to permit the passage through it of the sand or other molding material, while the castings are discharged through a spout, $m$, into a cooling room, $A^4$. The sand passes from the screen M to a riddle, N, where the sand is properly sifted and from which it is carried by means of conveyers, O, back to the molding room and there discharged.

The apparatus thus organized and arranged operates in the following manner: The molding room $A^2$, being of comparatively large dimensions, will accommodate a large number of workmen, and molding machines in case these latter are used. The molds are made in the usual manner in the molding room, and when a workman has finished a mold he places it upon the first convenient carrier G, these latter moving continuously through the room so that one of them is always handy to receive the finished mold. When placed upon the carrier the flask is removed from the mold, leaving only the bottom thereof, upon which the sand of which the mold is composed rests. The carriers are in continuous movement and are loaded as occasion may require. As each loaded carrier proceeds along the track F into the pouring room A³, one of the weights H² is lifted from one of the carriers H' and placed upon the mold, serving to retain the mold in position on its carrier G and to compact the same and prevent disintegration of the mold under the strain to which this is subjected when the molten metal is poured into the same. One of the carriers C', loaded with a ladle D filled with the molten metal, is moved along the track C by an attendant into the pouring room A³ and the attendant then steps upon the moving platform E and by means of the handle of the ladle brings the same into the proper position over the mold. It should be noted that the platform E and carriers G move at the same rate of speed as do also the carriers C' which support the pouring ladles, so that the pouring operation proceeds without interruption, while the several parts are in motion. After the mold is filled, the ladle D and its carrier C' are returned along the track C to the cupola room to be refilled, while the mold is carried along that portion of the track F which extends beyond the straight portion of the track C and beyond the moving platform E toward the elevator. During this portion of its progress the metal of which the casting is composed is partially cooled, the cooling being sufficient to permit subsequent handling of the mold in the manner hereinafter described. It is also during this portion of the course of each mold that the weight H², which was placed thereon before the pouring, is removed from the mold and replaced upon one of the carriers H', by means of which latter it is carried around into a position where it may be placed upon a subsequent mold. By means of the fork J and the mechanism connected therewith the mold is lifted bodily from the carrier G and transferred to the elevator, upon which it is placed in any suitable position, the fork being automatically returned to its original position in the manner hereinbefore described. The mold having reached the top of the elevator is discharged upon the screen M and being of the structure described falls apart, when an attendant picks out and removes the bottom of the flask, while the remaining portion, composing the sand and the casting, is separated, the sand dropping through the screen and the casting being discharged through the spout m either into the cooling room A⁴ where it may be allowed to further cool and harden, if necessary, or it may be discharged directly from the spout into a rumble or other suitable cleaning apparatus. The sand of which the mold is composed passes through the screen M into the riddle N where it is sifted and whence it is carried by the conveyers O back to the molding room and there distributed, as desired.

It will be observed that the employment of manual labor in the transportation of the molds, ladles, castings, sand, &c., is practically entirely dispensed with by the use of the apparatus just described, these several objects being carried automatically from point to point at the proper time and moving in unison along parallel lines during the operation of pouring so that no interruption of the travel of the carriers is necessary and their movement is rendered continuous. The economy in time, labor and expense resulting from this mode of operation is too obvious to require any extended discussion. In the manufacture of small castings, to which the apparatus is more particularly adapted, this economy is evidently of material importance.

Although I have described an arrangement and relative location of the several parts of the plant and of the several operative mechanisms thereof which I deem advantageous, I do not wish to be understood as limiting myself to this particular arrangement and location since it is obvious that substantially the same objects and many of the beneficial results aimed at may be obtained by other arrangements, or by other relative locations. Moreover, although I have shown and described certain mechanisms which are of my invention and which I prefer to employ for the purposes set forth, I do not wish to be understood as limiting myself to the employment of these devices, as other devices of a kindred nature capable of accomplishing the same results may be substituted under certain circumstances without departing from the principle of my invention.

Having thus described my invention, what I claim as new, and desire to secure by Letters Patent, is—

1. An apparatus for manufacturing castings, comprising a cupola, an endless track passing near the cupola provided with one or more pouring ladles supported thereon by carriers, a second endless track passing through the molding space and extending for a portion of its length parallel with and in close proximity to the ladle track, carriers on said second track adapted to receive the molds, and means for moving said mold carriers along said track, substantially as described.

2. An apparatus for manufacturing castings, comprising a cupola, an endless track passing adjacent thereto and provided with one or more pouring ladles supported thereon by carriers, a second endless track passing through the molding space and extending for a portion of its length parallel with and in close proximity to the ladle track and provided with mold carriers, means for actuating said mold carriers an endless moving platform located subjacent to and parallel with the parallel portions of the two tracks and moving in unison with the mold carriers, and means for moving the said platform substantially as described.

3. In an apparatus for manufacturing castings, the combination, with a cupola, an endless track passing adjacent thereto and one or more pouring ladles supported on said track by carriers, of a second endless track extending through the molding space and alongside of the ladle track and provided with mold carriers, means for imparting a continuous movement to said mold carriers, a third endless track extending parallel with the ladle and mold carrier tracks and provided with a series of weight carriers, and means for imparting a continuous motion to said weight carriers, substantially as described.

4. In an apparatus for manufacturing castings, the combination, with the cupola, the pouring ladles and their track, passing near the cupola of an endless track passing through the molding space and alongside of and beyond the ladle track and provided with mold carriers, means for imparting a continuous movement to said mold carriers, an elevator to receive the filled molds from the mold carriers after pouring, and a screen to receive the molds from the elevator and separately discharge the castings and sand, substantially as described.

5. In an apparatus for manufacturing castings, the combination, with the cupola and the pouring ladles and their track, passing adjacent to the cupola of an endless track extending through the molding space and alongside of and beyond the ladle track and provided with mold carriers, means for imparting a continuous movement to said mold carriers, an elevator located adjacent to the mold carrier track at a point beyond the ladle track, a hoisting and transferring device for lifting the molds from the carriers and delivering them on to the elevator, and a screen to receive the molds from the elevator and separately discharge the castings and sand, substantially as described.

6. An apparatus for manufacturing castings, comprising a cupola room containing a cupola, a molding room, a pouring room located between the cupola and molding rooms, an endless track extending from the cupola room into the pouring room and provided with carriers having pouring ladles, a second endless track extending from the molding room into the pouring room and arranged parallel with the ladle track within this latter, a series of mold carriers mounted on said last-mentioned endless track, and means for imparting a continuous movement to said mold carriers, substantially as described.

7. An apparatus for manufacturing castings, comprising a molding space, an endless track extending in a sinuous course through said molding space and provided with a series of mold carriers, and means for imparting motion to said mold carriers, substantially as described.

8. An apparatus for manufacturing castings, comprising a cupola room or space, a mold room or space, an intermediate pouring room or space, endless tracks extending, respectively, from the cupola and molding rooms into the pouring room and provided with carriers for the pouring ladles and molds respectively, a cooling room, and an elevator and screen for conveying the castings from the pouring room to the cooling room, substantially as described.

9. In an apparatus for manufacturing castings, the combination, with the cupola and the pouring ladles and their track, passing adjacent to the cupola of an endless track extending from the molding space alongside of the ladle track and provided with mold carriers, means for imparting motion to said mold carriers, an elevator to receive the filled molds, a screen to separate the castings and sand, a riddle to receive the sand from the screen and sift the same, and conveyers to transport the same back to the mold space, substantially as described.

10. In an apparatus for manufacturing castings, the combination, with the ladles and their track passing adjacent to the cupola and the mold carriers and their track, extending from the molding space to the pouring-room alongside the ladle-track, of a moving platform comprising a sprocket-chain and suitable driving and supporting wheels, plates pivoted to said chain near one of their ends and overlapping, as described, supporting ways along the upper line of travel of said platform, and supporting rollers mounted on the plates and bearing on said ways, substantially as described.

11. In an apparatus for manufacturing castings, the combination, with an endless track, provided with mold carriers, of an elevator located adjacent thereto, a lifting and transferring fork, and means under the control of the operator for automatically lifting said fork, moving it transversely across the elevator and returning it to its original position, substantially as described.

12. In an apparatus for manufacturing castings, the combination, with an endless track, provided with mold carriers, and an elevator located adjacent thereto, of a tilting and lifting track, means under the control of the operator for actuating said track, and a truck mounted on said track and having loosely suspended from it a fork which is adapted to receive and carry the molds, substantially as described.

13. In an apparatus for manufacturing castings, the combination, with the mold carriers and elevator, of the tilting and lifting track $J^2$ and means for actuating the same, said track being provided with stops $j^4$, $j^5$, the truck J' mounted on said track, and the fork J suspended from said truck by chains $j^2$, substantially as described.

14. In an apparatus for manufacturing castings, the combination, with the tilting and lifting track and its truck, of the transferring fork suspended therefrom, a lever connected with said track, a shaft provided with a cam on which said lever rests, a continuously rotating pulley provided with a ratchet-wheel and mounted loosely on said shaft, an arm secured on said shaft and provided with a spring pawl to engage said ratchet-wheel, a cam arranged to hold the pawl normally out of engagement with the ratchet-wheel, and means under the control of the operator for partially rotating said last-mentioned cam to free the pawl to permit it to engage the ratchet-wheel, substantially as described.

15. In an apparatus for manufacturing castings, the combination, with the lifting and tilting track $J^2$, and the transferring fork J suspended therefrom, of the lever $K^2$, the connecting rod $k'$ connecting said lever and track, the shaft K having cam $K'$ on which the lever rests, the loose pulley L mounted on said shaft and having ratchet-wheel $l$, the arm $k^2$ secured on the shaft K and having spring pawl $k^3$, the cam $l'$ arranged in the path of the spring pawl, the arm $l^2$ connected with said cam $l'$, the lever L', and the connecting rod $l^3$ between the lever K' and arm $l^2$, substantially as described.

16. In an apparatus for manufacturing castings, the combination, with a track and a ladle, of a carrier mounted on the track and supporting the ladle, and having a frame which is flexible around a vertical axis, the two parts of the frame being united by an elastic connection which tends to hold them normally in line, substantially as described.

17. In an apparatus for manufacturing castings, the combination, with a track and a ladle, of a carrier mounted on the track and supporting the ladle, and having a frame composed of two stiff frame sections, the lower one hinged to the upper one by a stiff horizontal pivot on which it is free to swing only in a direction transverse to the line of travel of the carrier, substantially as described.

18. In an apparatus for manufacturing castings, the combination, with a track and a ladle, of a carrier mounted on the track and supporting the ladle, and having a frame which is flexible around a vertical axis, and a stiff horizontal axis on which it is free to swing only in a direction transverse to the carrier, substantially as described.

19. In an apparatus for manufacturing castings, the combination, with a track, of a ladle carrier, comprising two uprights $c$, each having trolley-wheels above and below the track, an elastic connecting bar $c^2$ between the upper ends of the uprights, a jointed connecting bar $c^3$ between the lower ends of the uprights, and the members $c^4$ suspended loosely from the lower ends of the uprights, and pivotally connected at their lower ends, substantially as described.

20. In an apparatus for manufacturing castings, the combination, with a pouring ladle and a track, of a carrier mounted on said track, a winch mounted on the carrier and provided with an eccentric drum, and a chain having one end attached to the drum, the other end fixed, and the intermediate portion passing under a pulley connected with the ladle, substantially as described.

21. In an apparatus for manufacturing castings, the combination, with the carrier and its track, of a yoke connected with the carrier, and a ladle mounted in the yoke by means of an inclined axis, substantially as described.

22. In an apparatus for manufacturing castings, the combination, with the track and carrier, of a ladle having a laterally projecting handle and mounted in a yoke, and a rod having its upper end suitably connected with the carried and its lower end eccentrically connected with the yoke, substantially as described.

WILLIAM W. DOOLITTLE.

Witnesses:
 J. M. THACHER,
 R. C. PAGE.